United States Patent [19]

Christe et al.

[11] 4,374,112

[45] Feb. 15, 1983

[54] STABLE $NF_4^+$ SALT OF HIGH FLUORINE CONTENT

[75] Inventors: Karl O. Christe, Calabasas; William W. Wilson, Canoga Park, both of Calif.

[73] Assignee: The United States of America as represented by the Secretary of the Army, Washington, D.C.

[21] Appl. No.: 219,056

[22] Filed: Dec. 22, 1980

[51] Int. Cl.$^3$ .................. C01B 21/00; C01G 45/00
[52] U.S. Cl. ................................ 423/351; 423/472; 149/119
[58] Field of Search .............................. 423/351, 472

[56] References Cited

U.S. PATENT DOCUMENTS

| | | | |
|---|---|---|---|
| 4,107,275 | 8/1978 | Christe et al. | 423/276 |
| 4,108,965 | 8/1978 | Christe et al. | 423/351 |
| 4,152,406 | 5/1979 | Christe et al. | 423/351 |
| 4,172,884 | 10/1979 | Christe et al. | 423/351 |

OTHER PUBLICATIONS

Cotton, Ed. *Progress in Inorganic Chemistry,* vol. II, Interscience N.Y. (1960), pp. 209–214.
Hoppe et al., "Manganese Tetrafluoride", *Chemical Abstracts,* vol. 58 (1962), No. 220b.
Jenkins et al., "Reappraisal of Thermochemical Radii for Complex Ions", *Journal of Chemical Education,* vol. 56, No. 9, Sep. (1979), pp. 576, 577.
Karl O. Christe, Inorg. Chem., 16, 2238–2241 (1977).

*Primary Examiner*—Brian E. Hearn
*Attorney, Agent, or Firm*—Nathan Edelberg; Robert P. Gibson; Jack W. Voight

[57] ABSTRACT

An improved $NF_4^+$ composition for solid propellant $NF_3$-$F_2$ gas generators and high detonation pressure explosives is described which combines high oxidizer content with good thermal stability. The novel composition has the formula $(NF_4)_2MnF_6$, and a process for its production is disclosed.

1 Claim, No Drawings

STABLE NF$_4^+$ SALT OF HIGH FLUORINE CONTENT

DEDICATORY CLAUSE

The invention described herein was made in the course of or under a contract or subcontract thereunder with the Government; therefore, the invention described herein may be manufactured, used, or licensed by or for the Government for governmental purposes without the payment to us of any royalties thereon.

BACKGROUND OF THE INVENTION

1. Field of the Invention

This invention relates to a composition of matter and a method of producing the same and is particularly directed to improved solid propellant NF$_3$-F$_2$ gas generators and high detonation pressure explosives.

2. Description of Prior Art

NF$_4^+$ salts are the key ingredients for solid propellant NF$_3$—F$_2$ gas generators, as shown by D. Pilipovich in U.S. Pat. No. 3,963,542. These propellants consist of a highly over-oxidized grain using NF$_4^+$ salts as the oxidizer. Burning these propellants with a small amount of fuel, such as aluminum, powder, generates sufficient heat to thermally dissociate the bulk of the oxidizer. This is shown in NF$_4$BF$_4$ in the following equation:

$$NF_4BF_4 \rightarrow NF_3 + F_2 + BF_3$$

As can be seen from the equation the gaseous combustion products contain the volatile Lewis acid BF$_3$. This disadvantage of a volatile Lewis acid by-product is shared by many of the previously known NF$_4^+$ compositions. These volatile Lewis acids possess a relatively high-molecular weight and a low $\gamma$ value ($\gamma = C_{pi}/C_{vi}$), relative to the preferred diluent helium and frequently act as a deactivator for the chemical HF-DF laser. Consequently, these volatile Lewis acids must be removed from the generated gas prior to its use in an efficient chemical laser. Based on the state of the art, this is achieved by adding a clinker forming agent, such as KF, to the solid propellant formulation. The function of this additive serves to convert the volatile Lewis acid, such as BF$_3$, to a non-volatile salt as shown by the following equation:

$$KF + BF_3 \rightarrow KBF_4$$

In addition, several NF$_4^+$ compositions are known which are based on self-clinkering NF$_4^+$ salts, as shown by K. O. Christe et al in U.S. Pat. No. 4,172,884. The theoretical fluorine yields achievable with the presently known NF$_4^+$ salts are summarized in Table 1.

TABLE 1

Theoretical Fluorine Yields (in the form of NF$_3$ and F$_2$) of Presently Known NF$_4^+$ Salts Before Burning.

| RANK | SYSTEM | THEORETICAL F, WT. PERCENT |
|---|---|---|
| 1 | (NF$_4$)$_2$NiF$_6$ | 64.6 |
| 2 | (NF$_4$)$_2$SnF$_6$ | 46.0 |
| 3 | (NF$_4$)$_2$TiF$_6$.2.4KF | 39.5 |
| 4 | NF$_4$BF$_4$.1.2KF | 38.6 |
| 5 | (NF$_4$)$_2$GeF$_6$.2.4KF | 37.6 |
| 6 | NF$_4$SnF$_5$ | 31.3 |
| 7 | NF$_4$PF$_6$.1.2KF | 31.2 |
| 8 | NF$_4$GeF$_5$.1.2KF | 29.0 |
| 9 | NF$_4$AsF$_6$.12KF | 27.3 |
| 10 | NF$_4$SbF$_6$.1.2KF | 24.0 |
| 11 | NF$_4$BiF$_6$.1.2 KF | 19.7 |

As can be seen from Table 1, the self-clinkering (NF$_4$)$_2$NiF$_6$ salt gives by far the highest fluorine yield. Unfortunately, the thermal stability of (NF$_4$)$_2$NiF$_6$ (See: K. O. Christe, Inorg. Chem 16, 2238, 1977) is insufficient to pass the requirements of long term stability tests.

Another potential application for energetic NF$_4^+$ salts is their use in high detonation pressure explosives as disclosed in a recently issued patent titled: "High Detonation Pressure Explosives", (for additional information see U.S. Pat. No. 4,207,124, dated June 10, 1980, by Karl O. Christe, one of the co-inventors of the instant invention).

Again, the most energetic NF$_4^+$ salt, i.e. (NF$_4$)$_2$NiF$_6$, has the major drawback of insufficient thermal stability to meet long term storability requirements.

The above discussion demonstrates that the prior art provided either a high performing NF$_4^+$ salt of insufficient thermal stability or low performing NF$_4^+$ salts of sufficient thermal stability. However, an NF$_4^+$ salt combining both high energy and good thermal stability has previously been unknown.

Accordingly, it is an object of the present invention to provide a high performing NF$_4^+$ salt of a thermal stability sufficient to meet long term stability requirements.

Another object of the present invention is to provide a process for the production of such a high performing stable NF$_4^+$ salt.

These and other objects and features of the present invention will be apparent from the examples set forth hereinbelow. It is understood, however, that these examples are merely illustrative of the invention and should not be considered as limiting the invention in any sense.

BRIEF SUMMARY OF THE INVENTION

The above described problem of obtaining an NF$_4^+$ salt which combines both high energy and good thermal stability is overcome by the present invention. We have found that the new composition (NF$_4$)$_2$MnF$_6$ not only has a high theoretical fluorine content of 59.9 weight percent, but also possesses the thermal stability required for long term storability. This salt is prepared by the metathetical reaction of Cs$_2$MnF$_6$ with NF$_4$SbF$_6$ in anhydrous HF as a solvent.

DETAILED DESCRIPTION OF THE INVENTION

Preparation and Purification

In the N$_2$ atmosphere of a dry box a mixture of NF$_4$SbF$_6$ (37.29 mmol) and Cs$_2$MnF$_6$ (18.53 mmol) was placed into the bottom a prepassivated Teflon FEP double U-tube metathesis apparatus. Dry HF (20 ml liquid) was added at $-78°$ C. on the vacuum line, and the mixture was warmed to $25°$ C. for 30 min with stirring. The mixture was cooled to $-78°$ C. and pressure filtered at this temperature. The HF solvent was pumped off at $30°$ C. for 12 hours. The white filter-cake (14 g, weight clcd for 37.1 mmol of CsSbF$_6$ = 13.7 g)

was shown by Raman spectroscopy to consist mainly of $CsSbF_6$. The yellow filtrate residue (6.1 g, weight clcd for 18.5 mmol of $(NF_4)_2MnF_6=6.46$ g) was shown by elemental analysis to have the following composition (weight %): $(NF_4)_2MnF_6$, 91.27; $NF_4SbF_6$ 4.27; $CsSbF_6$ 4.46. For the elemental analysis, a sample of $(NF_4)_2MnF_6$ was hydrolyzed in $H_2O$, and $NF_3$ and $O_2$ evolution was measured by PVT and gas chromatography, and Cs, Sb, and Mn in the hydrolysate were determined by atomic absorption spectroscopy. Anal. Calcd for $(NF_4)_2MnF_6$ 91.27, $NF_4SbF_6$ 4.27, $CsSbF_6$ 4.46; $NF_3$, 38.07; Mn, 14.37; Sb, 3.07; Cs, 1.61. Found $NF_3$, 37.8; Mn, 14.5; Sb, 3.10; Cs, 1.62. Purification of the sample is accomplished by using well established recrystallization techniques.

Solubility and Reactivity Properties

The $(NF_4)_2MnF_6$ salt is a yellow, crystallinic solid which is highly soluble in anhydrous HF. At 24° C., its solubility exceeds 1.30 g per g HF. It is stable at room temperature and, in the absence of fuels, it is not shock sensitive. With water a violent reaction occurs. By analogy with the other known $NF_4^+$ salts, the hydrolysis was found to result in quantitative $NF_3$ evolution and therefore, is a useful analytical method. The hydrolysis also produced oxygen in a $NF_3:O_2$ mole ratio of 8:5 in excellent agreement with the following equation:

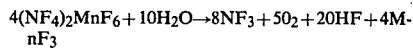

$$4(NF_4)_2MnF_6 + 10H_2O \rightarrow 8NF_3 + 5O_2 + 20HF + 4MnF_3$$

Stability and Thermal Decomposition Rate

At 65° C., $(NF_4)_2MnF_6$ appears to be stable, but at about 100° it starts to slowly decompose. Its decomposition rate in a sapphire reactor was monitored by total pressure measurements over the temperature range 100° to 130° C. Except for a slightly faster rate during the first 20 minutes, the decomposition pressures increased approximately linearly with time at 100° C. At 130° C. the rates slightly accelerated with increasing time, however, this rate increase was quite small. At 100° C. 0.17% of the sample decomposed in 17 hours, whereas, at 130° C. 0.66% of the sample decomposed in the same time. The gaseous decomposition products consisted of $NF_3$ and $F_2$ in a mol ratio of about 1 to 1.2. For identification of the solid residue, a sample of $(NF_4)_2MnF_6$ was completely decomposed in a dynamic vacuum at 240° C. Based on its weight, X-ray powder diffraction pattern and mauve color, this residue was identified as $MnF_3$. Consequently, $(NF_4)_2MnF_6$ decomposes according to $$2(NF_4)_2MnF_6 \rightarrow 4NF_3 + 5F_2 + 2MnF_3$$

A comparison with the decomposition data previously published for $(NF_4)_2NiF_6$ shows that the thermal stability of $(NF_4)_2MnF_6$ is significantly higher than that of $(NF_4)_2NiF_6$ which in 6 hours at 100° C. exhibited 9% decomposition.

Crystallographic Data

The X-ray powder diffration pattern of $(NF_4)_2MnF_6$ is listed in Table 2. It was indexed for a tetragonal unit cell with a=6.90 Å, c=9.23 Å, Z=2, space group I4/m, and a calculated density of 2.64 g cm$^{-3}$.

Ionic Nature By NMR Spectrum

The ionic nature of $(NF_4)_2MnF_6$ in HF solution was established by its $^{19}F$ NMR spectrum which was recorded over the temperature range +20° to −75° C. It showed at all temperatures a broad resonance at $\phi$ −218 (downfield from external $CFCl_3$), characteristic of $NF_4^+$. The lack of observable NF spin-spin coupling, generally seen for tetrahedral $NF_4^+$ is attributed to the influence of the paramagnetic $MnF_6^{2-}$ anion which can provide rapid relaxation.

TABLE 2

| X-Ray Powder Diffraction Data of $(NF_4)_2 MnF_6$ | | | | | |
|---|---|---|---|---|---|
| d obsd | Int | d clcd | d obsd | Int | d clcd |
| 5.55 | vs | 5.53 | 1.875 | ms | 1.874 |
| 3.45 | s | 3.45 | | | |
| 3.35 | s | 3.35 | 1.784 | w | 1.783 |
| 2.93 | ms | 2.93 | 1.726 | vw | 1.725 |
| 2.81 | ms | 2.81 | 1.677 | vw | 1.676 |
| 2.44 | m | 2.44 | 1.647 | mw | 1.647 |
| 2.307 | mw | 2.307 | 1.627 | mw | 1.627 |
| 2.183 | s | 2,182 | 1.585 | w | 1.585 |
| | | 2,179 | | | |
| 2.085 | mw | 2.086 | 1.538 | mw | 1.538 |
| 1.975 | vw | 1.973 | 1.466 | mw | 1.467 |

$^{(a)}$Cu $K_\alpha$ radiation and Ni filter

The ionic nature of $(NF_4)_2MnF_6$ in the solid state was established by its vibrational spectra which exhibit the bands characteristic for $NF_4^+$ and $MnF_6^{2-}$. The observed vibrational frequencies and their assignments are summarized in Table 3.

TABLE 3

| VIBRATIONAL SPECTRA OF SOLID $(NF_4)_2MnF_6$ | | | |
|---|---|---|---|
| Obsd freq, cm$^{-1}$, and rel intens | | Assignment (point group) | |
| IR | Raman | $NF_4^+$ $(T_d)$ | $MnF_6^{--}$ $(O_h)$ |
| 2310vw | | $2\nu_3(A + E + F_2)$ | |
| 2000w | | $\nu_1 + \nu_3(F_2)$ | |
| 1759vw | | $\nu_3 + \nu_4(A_1 + E + F_2)$ | |
| 1466w | | $\nu_1 + \nu_4(F_2)$ | |
| 1221mw | | $2\nu_4(A_1 + E + F_2)$ | |
| 1160vs | | $\nu_3(F_2)$ | $\nu_1 + \nu_3(F_{1u})$ |
| 1110sh | | | $\nu_2 + \nu_3(F_{1u} + F_{2u})$ |
| 1061vw | | $\nu_2 + \nu_4(F_1 + F_2)$ | |
| 915vw | | | $\nu_1 + \nu_4(F_{1u})$ |
| 856vvw | 855m | $\nu_1(A_1)$ | |
| 760sh | | | |
| 735sh | | | $\nu_2 + \nu_6(F_{1u} + F_{2u})$ |
| 620vs | | $\nu_4(F_2)$ | $\nu_3(F_{1u})$ |
| | 593 s | | $\nu_1(A_{1g})$ |
| 500vw | 505m | | $\nu_2(E_g)$ |
| 450vw | 450w | $\nu_2(E)$ | |
| 338s | | | $\nu_4(F_{1u})$ |
| | 304s | | $\nu_5(F_{2g})$ |

Obviously, numerous variations and modifications may be made without departing from the present invention. Accordingly, it should be clearly understood that the forms of the present invention described above are illustrative only and are not intended to limit the scope of the present invention.

We claim:

1. The salt having the formula: $(NF_4)_2MnF_6$, and characterized by having good thermal stability in storage.

* * * * *